United States Patent [19]

Schlosser

[11] Patent Number: 4,498,312

[45] Date of Patent: Feb. 12, 1985

[54] METHOD AND APPARATUS FOR MAINTAINING PRODUCTS AT SELECTED TEMPERATURES

[76] Inventor: Edward P. Schlosser, 509 Lawton Ave., Ridgefield, N.J. 07657

[21] Appl. No.: 554,525

[22] Filed: Nov. 23, 1983

[51] Int. Cl.³ ............................................. F25D 3/08
[52] U.S. Cl. ..................................... 62/457; 62/371; 62/430; 62/530
[58] Field of Search ................. 62/457, 371, 372, 529, 62/530, 430

[56] References Cited

U.S. PATENT DOCUMENTS

| 2,317,005 | 4/1943 | Wasserman | 62/371 |
| 2,393,245 | 1/1946 | Hadsell | 62/457 X |
| 3,807,194 | 4/1974 | Bond | 62/430 X |

FOREIGN PATENT DOCUMENTS

| 19855/29 | of 1929 | Australia | 62/530 |
| 622107 | 6/1961 | Canada | 62/529 |
| 511685 | 8/1939 | United Kingdom | 62/457 |
| 808690 | 2/1959 | United Kingdom | 62/457 |

Primary Examiner—Lloyd L. King
Attorney, Agent, or Firm—Eugene E. Geoffrey, Jr.

[57] ABSTRACT

Apparatus for maintaining products, such as foods, at selected temperatures which includes a chest or housing and in one form having hollow, slab-like containers lining the walls of the chest, the containers being filled with a solution such as a saline solution and in another form having trays adapted to be stacked one upon another within the chest with the bottom of each tray formed of a hollow, slab-like container also filled with a solution such as a saline solution, the containers may be heated either to temperatures as high as 180° F. to 200° F. or cooled to temperatures as low as or colder than 0° F. to maintain products at either high or low temperatures as may be desired and the invention further involves an improved method for maintaining products at a desired temperature.

7 Claims, 11 Drawing Figures

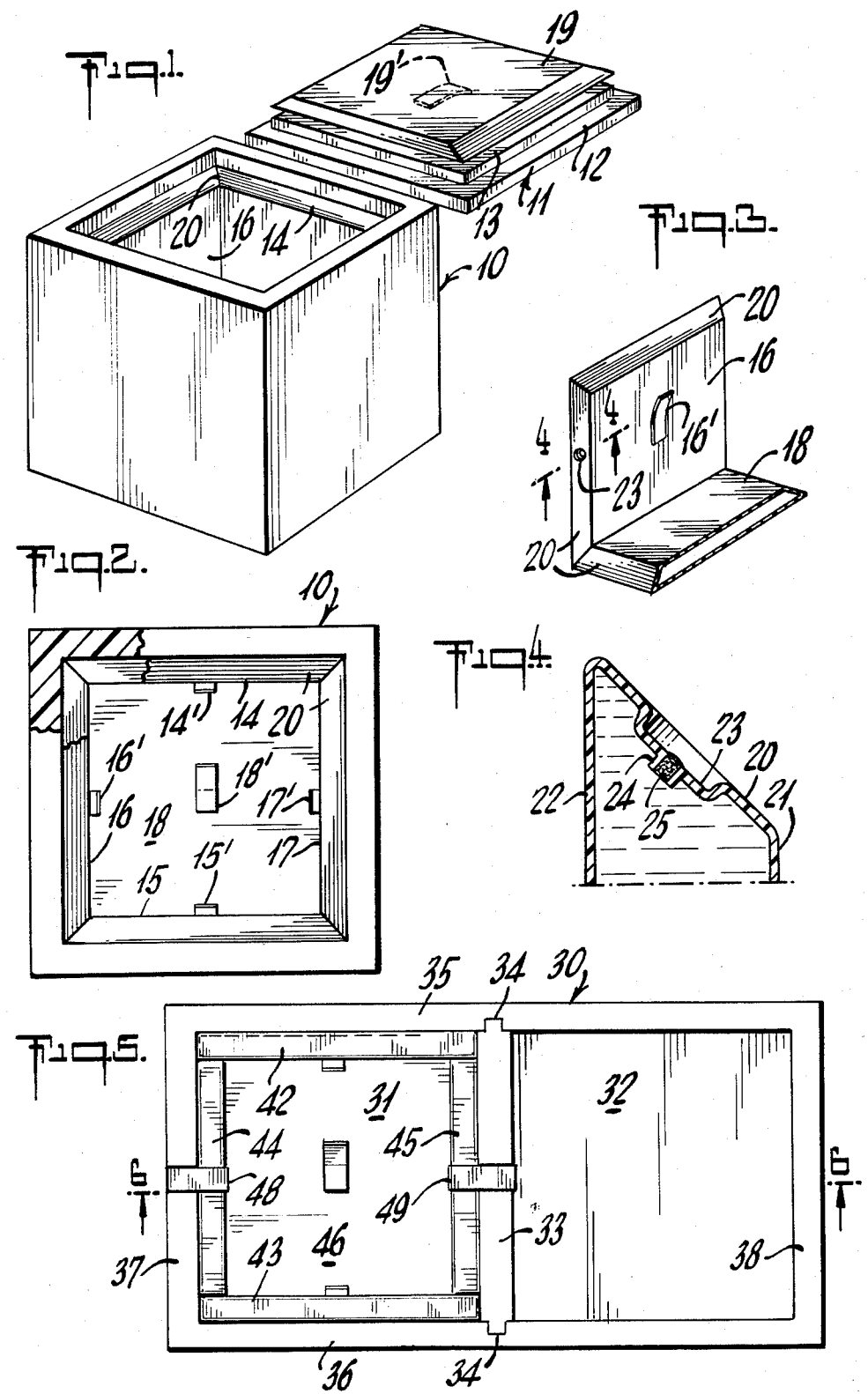

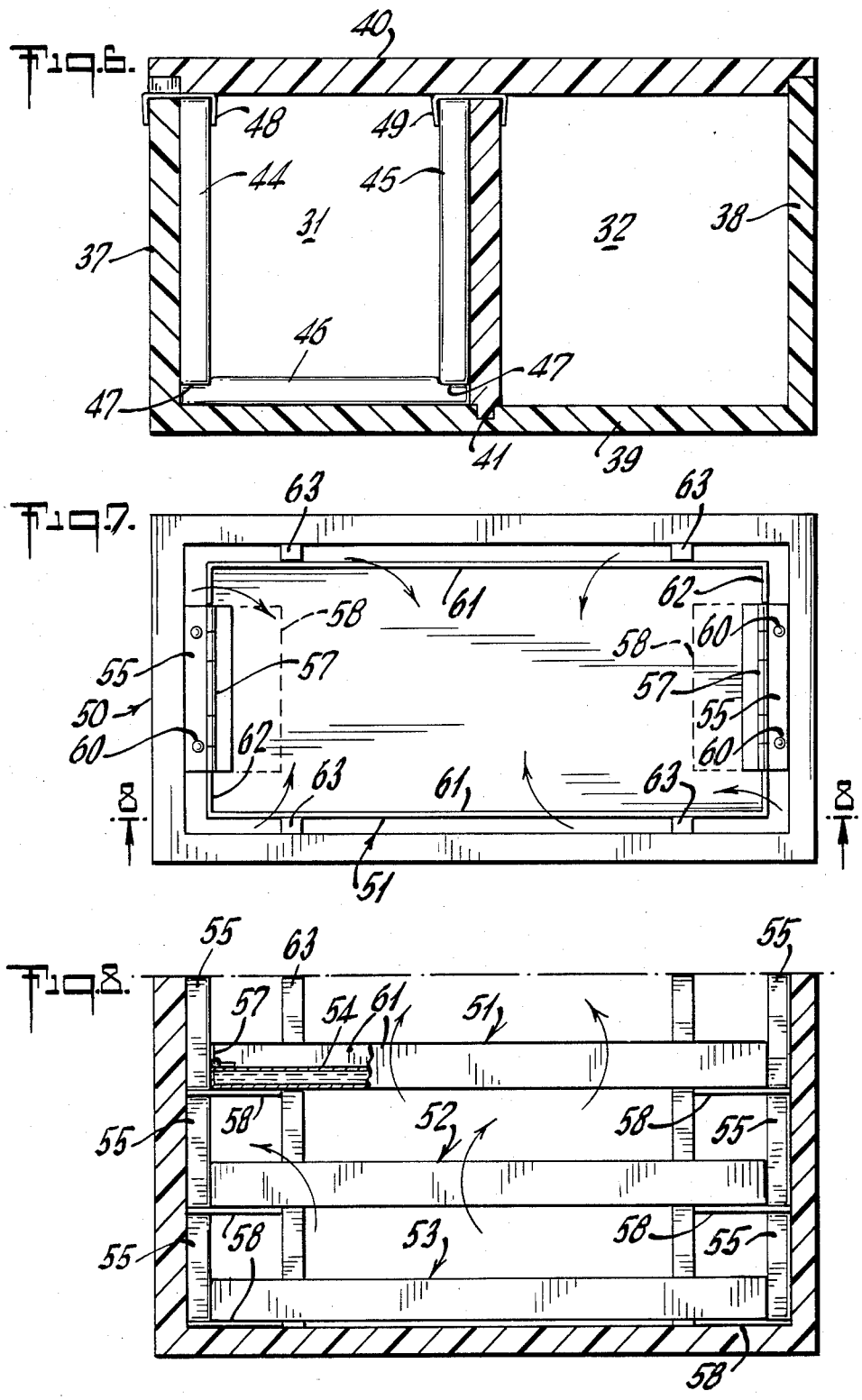

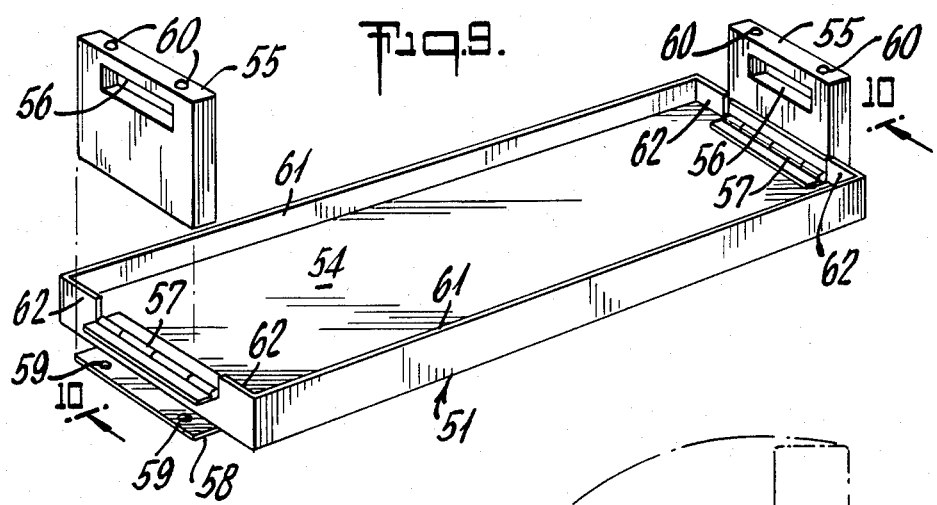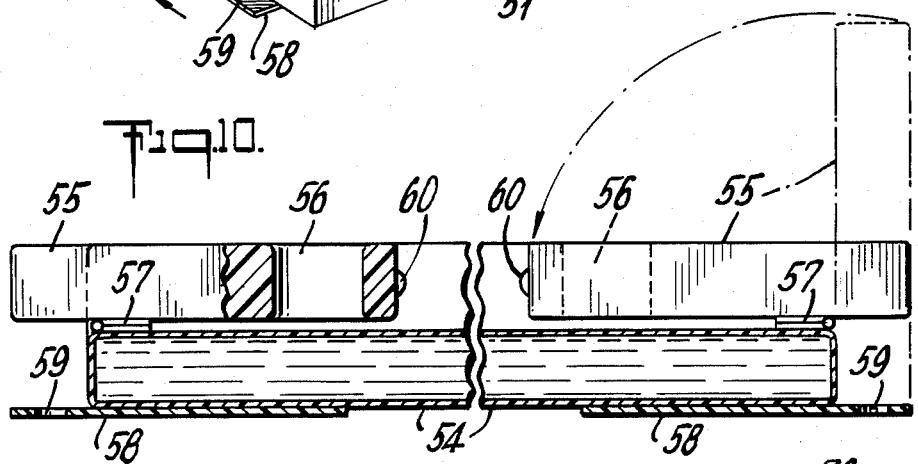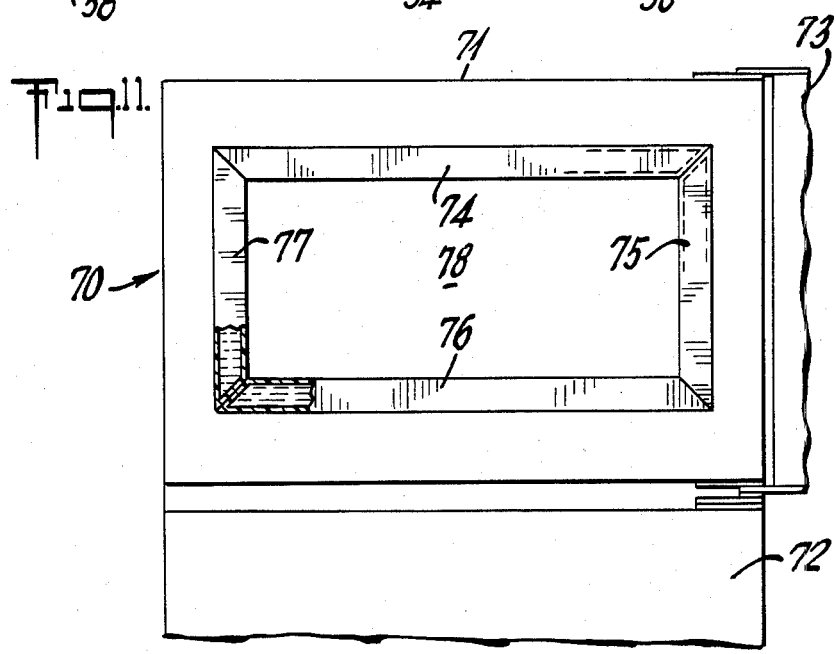

METHOD AND APPARATUS FOR MAINTAINING PRODUCTS AT SELECTED TEMPERATURES

This invention relates to a novel and improved method and means for maintaining foods and other products at selected temperatures either above or below ambient temperatures and more specifically a method and apparatus for maintaining products at desired high or low temperatures or raising or lowering the temperature of such products for extended periods of time for preservation and other purposes which does not require an external source of energy, does not emit undesirable gases and leaves no residue such as water or other liquid which may adversely affect the products.

Known refrigeration means for the cooling of foods and other products for transport when an external power source is unavailable or their maintenance in a frozen state usually involves the provision of an insulated chest and the utilization of chunks or cubes of ice or dry ice surrounding the products to be refrigerated. In such cases, ice will normally keep foods for instance at temperatures below ambient temperature but above freezing for a moderate length of time but care must be taken in many cases to protect the foods from the water resulting from the absorption of heat from the foods and penetrating the walls of the chest. In the case of dry ice which is at a much lower temperature than ice, an undesirable gas is emitted and therefor is not considered satisfactory for certain applications and particularly those involving confined spaces such as closed unventilated spaces in vehicles and particularly aircraft. To maintain products at temperatures above ambient temperature when an external power source is not available, the products such as foods are generally heated to the desired temperature and then placed in an insulated chest or housing to minimize the loss of heat.

This invention has as one of its objects a method and apparatus for refrigerating foods and other products for extended periods of time without the danger of damage or contamination caused by water resulting from melted ice or the emission of gases and which can be accomplished easily and effectively and at a relatively low cost.

Another object of the invention resides in the provision of means in the form of sealed hollow slabs or containers containing an improved substance which can be either heated or frozen by suitable means and which when placed about the walls of an insulated housing will occupy minimal space and function to maintain foods or other products at a desired temperature for periods of up to at least 10 hours or function to either raise or lower the temperature of articles when placed in the housing.

Still another object of the invention resides in the provision of novel and improved means which may be incorporated as part of the freezing compartment of an electromechanical refrigerator to maintain foods and other products below freezing temperatures for extended periods of time in the event of failure of refrigeration for any reason.

Still another object of the invention resides in the provision of a novel and improved chest for maintaining foods frozen for up to at least 10 hours without the emission of gases such as carbon dioxide and which is particularly useful in connection with the supply of foods in sealed spaces such as aircraft and the like or to maintain foods at temperatures above ambient temperature.

A still further object of the invention resides in the provision of a sectioned chest with improved means for maintaining one chest section at a temperature below freezing and the other section in the range of 34° F. to about 50° F. for holding products not required to be frozen.

The invention involves a chest or housing formed of insulating material such as styrofoam or the like having at least one compartment therein and a plurality of hollow, slab-like containers removably lining the walls of the compartment. Each container is filled with a solution containing for instance salt and water and is sealed to retain the solution therein. Upon either heating or cooling the solution in each of the containers and placement in the chest compartment, products such as foods and other items can be maintained above or well below ambient temperature for extended periods of time. Such an arrangement, particularly when maintaining foods at cold temperatures and even below freezing, prevents contamination of foods which occurs when using ice cubes or the like and does not emit gases such as carbon dioxide so that a chest according to the invention can be used in enclosed spaces such as an aircraft. The invention may be used in the freezer compartments of electromechanical refrigerators to protect cooled and frozen foods in the event of power loss or other problems that may be encountered.

The above and other objects and advantages of the invention will become more apparent from the following description and accompanying drawings forming part of this application.

IN THE DRAWINGS

FIG. 1 is a perspective view of a heating or cooling chest in accordance with the invention;

FIG. 2 is a top view in partial section of the chest shown in FIG. 1;

FIG. 3 is a fragmentary perspective view of two elements or containers used within the chest of FIG. 1;

FIG. 4 is a cross-sectional view of FIG. 3 taken along the lines 4—4 thereof;

FIG. 5 is a top view of a modified form of a refrigerator chest in accordance with the invention;

FIG. 6 is a cross-sectional view of FIG. 5 taken along the lines 6—6 thereof;

FIG. 7 is a top view of still another form of a refrigerator chest in accordance with the invention;

FIG. 8 is a cross-sectional view of FIG. 7 taken along the lines 8—8 thereof;

FIG. 9 is a perspective view in partially exploded form of a refrigerating tray utilized with the form of the invention illustrated in FIGS. 7 and 8;

FIG. 10 is a cross-sectional view of FIG. 9 taken along the lines 10—10 thereof; and FIG. 11 is a fragmentary front view of an electromechanical refrigerator embodying refrigerating elements or containers in accordance with the invention.

Referring now to the drawings and more specifically to FIGS. 1 through 4 showing one embodiment of the invention, the numeral 10 denotes a chest or housing formed of insulating material such as styrofoam or the like and a cover 11 also of insulating material and having a top portion 12 adapted to overlie the upper edges of the chest 10 and a portion 13 of slightly smaller dimensions to fit within the opening of the chest 10 and maintain the cover 11 in alignment with the chest.

The invention will now be described in connection with the refrigeration of products such as foods though it will be apparent that the invention may also be used for maintaining products at temperatures above ambient temperature.

The inner surfaces of the chest 10 are lined with refrigerating elements 14 through 19, each of which have edge portions 20 tapered at a 45° angle relative to the surfaces of the elements. With this arrangement, the elements 14 through 19 are readily removable from the chest and when inserted will be retained in position against the bottom and side walls of the chest. For instance, the bottom element 18 would first be inserted in the chest 10 and a tab 18' is provided to facilitate installation and removal of that element. Then the side wall elements 14 through 17 are inserted whereby the bottom edges of each of these elements will cooperate with the tapered edges of the bottom element 18 to hold them in place. At the same time, the elements 14 through 17 also engage one another to retain all four elements in position against the side walls. The elements 14 through 17 may also include tabs 14' through 17' to facilitate installation and removal of the side wall elements. It will also be observed from FIG. 1 that the side wall elements terminate in spaced relationship to the top edge of the chest 10 to provide adequate space for receipt of the top element 19 and the cover 11. The top element 19 may also be provided with a tab 19' on the other side thereof to facilitate its installation and removal.

Each of the refrigerating elements 14 through 19 is in the form of a hollow structure, a fragmentary portion being illustrated in FIG. 4, having inner and outer walls 21 and 22 and inclined edges 20. One inclined edge 20 of each of the refrigerating elements includes a recessed portion 23 having a filler opening 24 therein. A freezeable liquid is utilized to fill each of the elements whereupon a plug 25 is preferably permanently sealed in the opening 24 to retain the liquid therein. While any suitable liquid may be employed, it has been found that a salt water solution is highly effective and may be prepared by mixing approximately 3 tablespoons of salt to each quart of water.

When preparing the chest for use, the elements 14 through 19, after having been filled with the refrigerating liquid, are placed in a suitable refrigerator or freezer to freeze the liquid in the refrigerating elements. When the elements have reached the desired temperature, usually well below the freezing point of water and preferably below 0° F., the refrigerating elements are then placed in the chest 10 as previously described and the cover 11 placed on top of the chest 10 to form a completed closed compartment with the refrigerating elements in place.

Actual tests with the refrigerating chest as described above have indicated that it is possible to maintain such products as ice cream, flavored ices and the like in a frozen state for at least 24 hours without the need for further refrigeration prior to serving. By properly adjusting the temperatures of the elements 14 through 19 prior to insertion in the chest, the invention may be readily utilized for lowering the temperature of beverages and maintaining the beverages in a cooled condition for periods of up to 24 hours. It follows that any type of product can be readily maintained at a low temperature utilizing this invention and the chest 10 may be made with any suitable dimensions in order to comply with the needs of the user.

A modified form of the invention is illustrated in FIGS. 5 and 6. In this form of the invention, the chest, generally denoted by the numeral 30, has end walls 37 and 38, a bottom wall 39, side walls 35 and 36 and a cover 40 and is provided with a freezing compartment 31 and a cooling compartment 32. The compartments may be formed by a permanently installed separator 33 which is arranged to engage slots 34 and the side walls 35 and 36. If desired, the partition 33 may also engage a slot 41 in the bottom wall 39 as shown for instance in FIG. 6. The compartment 31 includes refrigerating elements 42 through 46 lining the side walls and the bottom. These refrigerating elements are identical to the elements 14 through 18 or may have edges which are square instead of being tapered. In the illustrated embodiment, the bottom element 46 has recessed portions 47 to receive the bottoms of elements 44 and 45 to lock them in position and clips 48 and 49 bridge the end wall 37 and the refrigerating element 44 and the partition 33 and the refrigerating element 45 to hold the upper portion of the refrigerating elements 44 and 45 in position. If desired, the heights of the refrigerating elements 42 through 45 may be decreased to permit the use of a top refrigerating element to close the compartment 31 independently of the lid 40 as illustrated in FIGS. 1 and 2. It may also be desirable to eliminate the partition 33 and clip 49 and arrange the refrigerating element 45 to serve as the sole partition between the compartments 31 and 32.

With the foregoing arrangement, the compartment 31 may be utilized to protect frozen foods while the compartment 32 could be utilized to hold food and other products that should be cooled but not frozen.

The forms of the invention as described may be of any desired size and configuration and may be formed of any desired material. In certain applications, the chests 10 or 30, as the case may be, may include an outer protective layer and an inner protective layer. When using styrofoam or other similar material, the outer, and, if desired, the inner surfaces may be coated with a protective material to afford the desired mechanical strength.

Still another form of the invention is illustrated in FIGS. 7 through 10. This form of the invention includes a housing 50 formed of a suitable insulating material and adapted to hold a plurality of trays such as trays 51 through 53 of similar size and configuration. This form of the invention is particularly useful for holding a plurality of individual servings of foods such as ice cream or the like and maintain such food in a frozen state until used. This arrangement is particularly advantageous for use in closed spaces such as aircraft and the like as it does not emit gases such as carbon dioxide ($CO_2$) and there is no possibility of contamination of food products by water resulting from melting ice.

The trays 51 through 53 in the illustrated embodiment of the invention are substantially identical and accordingly only the tray 51 has been illustrated in FIGS. 9 and 10 and will now be described.

While the trays are essentially of rectangular configuration, as illustrated in FIG. 9, they of course may take any desired form. In the illustrated embodiment, the tray includes a bottom 54 in the form of a refrigerating element such as the elements discussed in connection with FIGS. 1 through 6. Each element is a hollow structure and contains a freezeable liquid such as salt water. Appropriate means are provided for filling the refrigerating element 54 as previously described. Opposing ends of the refrigerating element 54 are provided with handles 55 each having a finger opening 56 to enable the tray to be removed from the housing or chest 50. Each handle is secured to the refrigerating element 54 by means of a hinge 57 so that the handle 56 can be folded inwardly on to the top of the refrigerating element 54 as shown more clearly in FIG. 10. Plates 58 of plastic or other suitable material are affixed to the underside of the refrigerating element 54 and extend from the ends thereof to underlie the bottoms of the handles 56 when they are in the open position as shown in FIG. 9. The extending portion of each of the plates 58 have a pair of openings 59 which are engaged by bosses 60 on the top of handles 55 of the underlying tray and thus function to maintain the handles of the underlying trays in a vertical position when they are stacked in a chest such as illustrated in FIG. 8. Refrigerating element 54 further includes side and end walls 61 and 62 respectively which together with the handles 55 function to retain products stacked on the tray in position thereon. In the instant embodiment of the invention, the walls 61 and 62 extend above the upper surface of the refrigerating element 54 a distance approximately equal to the thickness of the handles 55. In this way when the liquid within the refrigerating element 54 is to be frozen, the handles can be folded down against the upper surface of the refrigerating element so that a number of trays can be stacked in a freezing compartment to freeze the liquid preparatory to the storage of foods and other products in the chest 50. It will also be observed that with the handles mounted in the manner described in connection with FIGS. 9 and 10, the handles function as end spacers to center the trays within the chest 50 and provide spaces on each side of the handles to permit the flow of air. In addition, the trays are made slightly narrower than the chest and spacers 63 are provided to center the trays sidewise and thus provide channels on each side of the trays to permit air flow. After the trays are inserted in the chest 50, a suitable cover or lid such as those shown in FIGS. 1 through 6 would be placed on top of the chest to completely close the compartment.

As mentioned in connection with the previous embodiments of the invention, the chest 50 may be formed of any suitable material having good insulating characteristics and may be provided both on the outside as well as the inside with protective layers of metal or plastic or in the alternative, the insulating material can be treated to harden the inner and outer surfaces.

A still further embodiment of the invention is illustrated in FIG. 11 and provides for the utilization of refrigerating elements of panels within the freezing compartment of a conventional electromechanical refrigerator and even within the cooling compartment, if desired. With such an arrangement, should operation of the refrigerator be interrupted for any reason whatsoever, such as failure of the refrigerating apparatus or loss of power, the food within the refrigerator will be protected for an extended period of time.

More specifically and with reference to FIG. 11, a conventional electromechanical refrigerator or the like is generally denoted by the numeral 70 and includes a freezing section 71 and a cooling section 72. The door 73 for the freezing section 71 is shown in fragmentary form and in the open position. In this embodiment of the invention, the freezing compartment is lined with refrigerating elements or panels 74 through 78 and held in position by any suitable means. In the instant embodiment of the invention, the panels 74 through 77 have edges tapered at 45° so that they will effectively interlock with associated panels so that all of the panels will be held in close position against the side walls of the freezing compartment. In as much as the panels are relatively thin, that is of the order of ¾ to one inch in thickness, they will not materially reduce the size of the space available for the storage of foods or other products. If desired, a fifth refrigerating element or panel may be utilized as a separate door closing the freezing compartment in addition to the normal door 73. This additional refrigerating element can of course be carried by the door 73 so that upon opening the door 73, there will be immediate access to the freezing compartment.

With this arrangement, the liquid within each of the elements 74 through 78 will always be maintained in a frozen state and therefore should operation of the refrigerator be interrupted for any reason whatsoever, the items stored in the freezer will be maintained in the frozen state for an extended period of time. As pointed out above, similar arrangement can utilized within the cooling compartment of the refrigerator and thus protect products stored in the cooling compartment in substantially the same manner as in connection with the freezing compartment.

When using the invention described above for maintaining foods in a heated condition, the elements or containers 14 through 19, 44 through 46 or 51 as the case may be would be heated to temperatures as high as 180° F. to 200° F. and then placed in the associated chest to maintain products at a higher than ambient temperature for extended periods of time.

While only certain embodiments of the invention have been illustrated and described, it is understood that alterations, changes and modifications may be made without departing from the true scope and spirit thereof.

What is claimed is:

1. Apparatus for maintaining products at a desired temperature comprising a chest of essentially rectangular configuration formed of heat insulating material and a plurality of relatively flat, hollow, sealed containers lining the sides, bottom and top of the inside of said chest, at least certain of said containers being formed to interlock one with others to hold them in position within the chest, each of said containers including a recessed opening and cooperating removable plug and adapted to be filled with a liquid having a high boiling point and a low freezing point, said containers upon being filled with said liquid and subjected to a selected temperature until the liquid reaches said selected temperature and then inserted in said chest, products in said chest will be maintained at approximately the selected temperature for an extended period of time.

2. Apparatus for maintaining products at a desired temperature according to claim 1 wherein said liquid is salt water and comprises approximately three tablespoons of salt for each quart of water.

3. Apparatus for maintaining products at a desired temperature according to claim 1 wherein each of said containers lining said bottom and side walls have tapered edges for cooperation with adjoining containers to retain them in position and said closure container overlying the top edges of the side wall containers and underlying the chest closure.

4. Apparatus for maintaining products at a desired temperature according to claim 1 wherein said chest comprises two compartments with one of said containers constituting at least part of the wall separating said compartments and the remainder of said containers lining the remaining walls of one of said compartments whereby said one compartment will maintain foods at approximately the selected temperature and the other compartment will maintain foods at temperatures closer to ambient temperature.

5. Apparatus for maintaining products at a desired temperature comprising a chest formed of insulating material, a plurality of individual trays removably carried by said housing, each of said trays having a bottom formed of a relatively thin, sealed, hollow container, said container being filled with a liquid having a high boiling point and a low freezing point and upwardly extending insulating handles carried by said tray to facilitate the transport of the individual trays, said chest being essentially of rectangular configuration having a bottom, four side walls and a removable cover, said trays are placed in said housing in overlying relationship with said handles holding said trays in spaced relationship one to the others.

6. A tray for use in a chest to maintain products, such as foods carried thereby at a selected temperature above or below ambient temperature comprising a generally rectangular bottom in the form of a relatively thin, sealed hollow container filled with a liquid having a high boiling point and a low freezing point, a rim about the edges of said bottom and extending above the upper surface thereof, and handles hinged to a pair of opposing edges of said bottom, each of said handles being hinged along the top edge of said bottom and foldable onto the top surface of said bottom and means on each tray to engage the handles on an underlying tray to retain the handles in vertical positions when trays are stacked one upon the other within said chest.

7. A tray for use in a chest to maintain products, such as foods carried thereby at a selected temperature above or below ambient temperature according to claim 9 wherein said engaging means includes interlocking elements carried on the top of each handle and the underside of the bottom with the interlocking elements on said bottom of one tray engaging cooperating interlocking elements on the top of each handle on an underlying tray.

* * * * *